June 1, 1954  D. E. BENCH  2,679,936
METHOD AND APPARATUS FOR FILTERING
Filed May 4, 1951 2 Sheets-Sheet 1
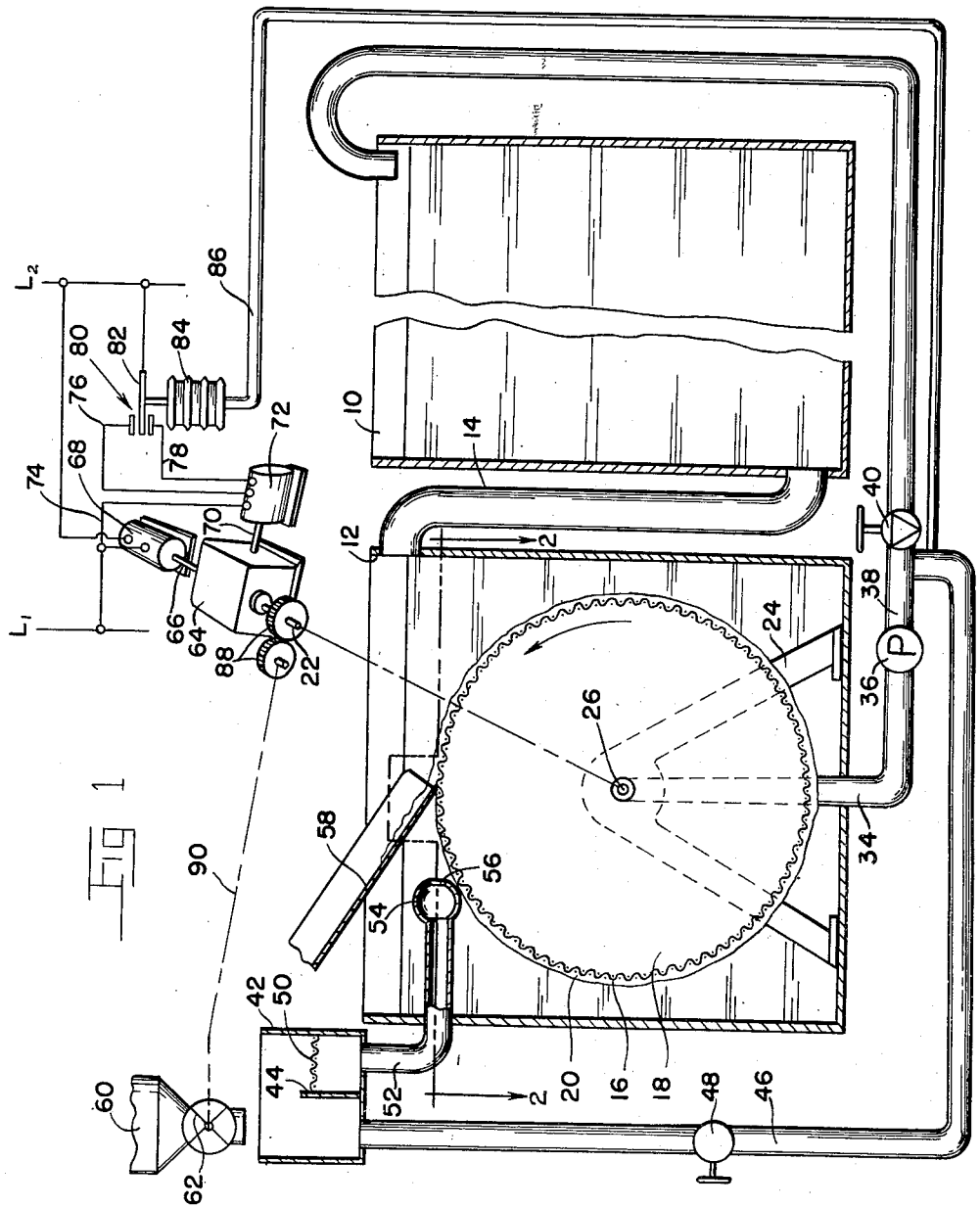
INVENTOR
DAVID E. BENCH
BY Toulmin & Toulmin
ATTORNEYS June 1, 1954  D. E. BENCH  2,679,936
METHOD AND APPARATUS FOR FILTERING
Filed May 4, 1951  2 Sheets-Sheet 2
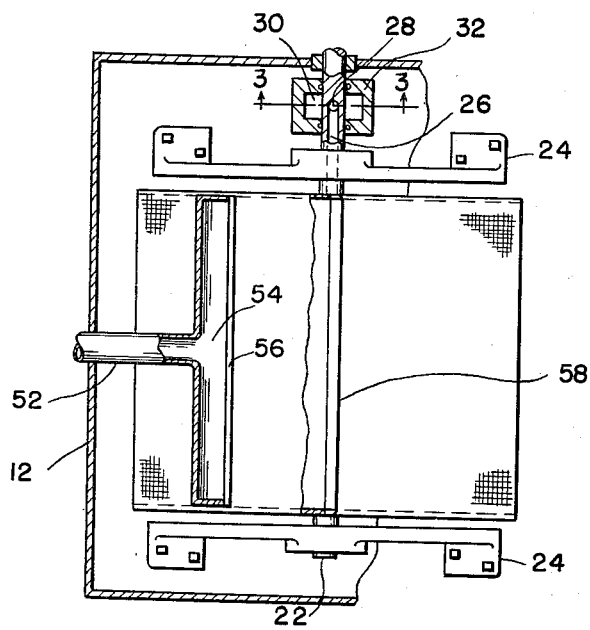
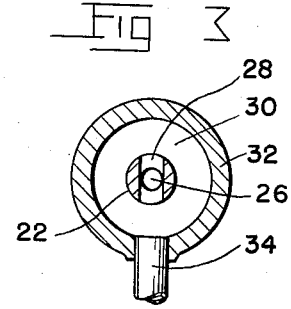
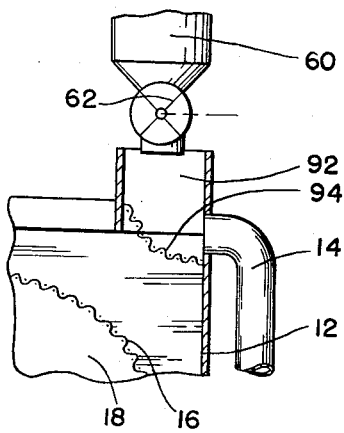
INVENTOR
DAVID E. BENCH
BY Toulmin & Toulmin
ATTORNEYS Patented June 1, 1954

2,679,936

UNITED STATES PATENT OFFICE 2,679,936

METHOD AND APPARATUS FOR FILTERING

David E. Bench, Trotwood, Ohio, assignor to The Commonwealth Engineering Company of Ohio, Dayton, Ohio, a corporation of Ohio Application May 4, 1951, Serial No. 224,517

3 Claims. (Cl. 210—199)

This invention relates to filters, and particularly to filters characterized in operating on a continuous cycle.

This application is a continuation-in-part of my copending application, Serial No. 30,060, filed May 29, 1948, and assigned to the same assignee as the instant application. In my application, Serial No. 30,060, now matured as Patent 2,576,275 under date of November 27, 1951, I disclose filtering arrangements in which the filtering element is a drum submerged in the fluid to be filtered and against which there bears a scraper blade so that when the drum is rotated, the scraper blade will remove all or a part of the filter cake from the drum. In my previously filed application, the rotation of the drum is intermittent, and whenever the drum is rotating, there is supplied to the fluid surrounding the drum a slurry of filter aid material which causes a clean filter cake to build up on the portion of the drum which is scraped by the action of the scraper blade as the drum rotates. This arrangement has proved eminently satisfactory for maintaining the filter in operation and permits a relatively small filter unit to be employed in instances where the usual batch type filter customarily encountered in the art would have to be a large unit. However, the intermittent movement of the drum requires rather extensive controls which are in themselves costly and which introduce a number of elements in the system which will require service and which may cause trouble and require considerable maintenance.

According to one modification illustrated in my previously filed application, but not specifically claimed therein, the filter drum is rotated continuously whenever the filter is in operation. This arrangement has the advantage of eliminating the controls for bringing about intermittent operation of the drum and is, therefore, somewhat less costly and requires less maintenance. In order to accommodate the speed of rotation of the filter drum to the filtering requirements of the job, the filter drum is made variable in speed and the controlling of the speed of rotation of the drum is the only special control arrangement required.

The supplying of a slurry of material for building up a filter cake on the scraped part of the drum is provided and this is also variable in its operation in direct proportion to the speed of rotation of the drum whereby the amount of filter cake forming material supplied is always substantially the proper amount and the operation of the unit is thereby made economical.

The nature of this invention will be more clearly understood on reference to the accompanying drawings in which:

Figure 1 is a sectional view, rather diagrammatic, of a filtering system constructed according to my invention.

Figure 2 is a plan sectional view looking down on top of the filtering drum of the system, as indicated by line 2—2 on Figure 1.

Figure 3 is a sectional view indicated by line 3—3 on Figure 2, and

Figure 4 is a fragmentary view showing a modified arrangement for supplying the filter cake forming material to the filtering drum.

Referring to the drawings somewhat more in detail, the work-tank that contains the fluid that is to be filtered is indicated at 10 and the filter tank is indicated at 12. A conduit 14 leads from a point adjacent the bottom of tank 10 to a point adjacent the top of tank 12. Mounted in tank 12 is a filtering drum 16 that consists of the imperforate heads or ends 18 and the perforate wall 20 which may comprise a fine woven screen or a flat sheet of material having small perforations therein. To the heads are attached shafts 22 which are rotatably supported by the brackets 24 mounted in the tank.

The one shaft 22 has a passage therein as indicated at 26 in Figures 1 and 2 and this passage is intersected by the transverse bar 28 so that the passage is communicated with the chamber 30 in the fitting 32. Fitting 32 has connected therewith conduit 34 that leads out the bottom of tank 12 to the inlet side of a pump 36. Pump 36 discharges into a conduit 38 that is arranged to deliver the pumped fluid into the end of tank 10 opposite the connection thereto of conduit 14.

Conduit 38 preferably includes a restriction such as the valve 40 by means of which the pressure between the pump 36 and restrictor 40 becomes indicative of the flow rate through the pump and, therefore, of the flow rate through the filter drum. This indication of the flow rate through the drum is utilized to determine the speed of rotation of the drum because when the flow rate through the drum falls below a predetermined amount, it indicates that the cake on the drum is becoming loaded with soil and a clean filtering surface should be presented to the fluid to be filtered. Similarly, whenever the flow rate through the drum is above a predetermined value, the rotational speed of the drum can be materially reduced in order to effect an economy in the use of the filter cake forming material.

At one side of tank 12 and in a somewhat elevated position is a small slurry tank 42 that may comprise an intermediate partition 44. The compartment to the left side to the partition 44 of Fig. 1 is connected by conduit 46 to the point on conduit 38 between pump 36 and restrictor 40 so that whenever pump 36 is operating, there is a supply of fluid to the compartment on the left side of partition 44. A valve 48 may be provided in conduit 46 for regulating the amount of flow that takes place in this manner, if so desired.

The compartment on the right side of partition 44 as viewed in Figure 1 preferably has a screen thereover, as at 50, and at the bottom of tank 42, this compartment is connected by conduit 52 with a manifold 54 having a discharge opening 56 directed toward the periphery of the filter drum immediately behind the scraper blade 58.

In position over slurry tank 42 and in position to discharge into the compartment on the left side of the partition 44 is a dispenser 60 of any well-known type having some sort of rotatable measuring and dispensing wheel 62 therein. Rotation of this dispensing wheel will cause the dispensing of filter cake forming material from the dispenser into slurry tank 42 where the material will become entrained with the fluid delivered to the slurry tank 42 through conduit 46 and will then flow through conduit 52 and manifold 54 into tank 12. Any of a great number of dry filter cake forming materials may be employed in the dispenser 60 and I found that diatomaceous earth and many commercial preparations are quite satisfactory.

One of shafts 22 is connected with the output shaft of a unit 64 that has an input shaft 66 driven by a motor 68. Unit 64 is a variable speed unit and the speed ratio between the output and input shafts is adapted for being varied over wide limits by rotation of a control shaft 70 that is connected with the output member of a reversible motor 72. Motor 72 has one of its terminals connected with power line L1 by a wire 74 and has its other terminals connected by wires 76 and 78 with the stationary contacts of a double throw switch 80 that comprises the movable blade 82 which is connected with the other power line L2.

Movable blade 82 is connected with a bellows arrangement 84 or some similar expansible and contractible element by means of which the blade 82 can be positioned in contact with either one or the other of the fixed contacts of switch 80, or held in the position of spaced relation with both of the contacts. Element 84 is connected by a conduit 86 with a point on conduit 38 between pump 36 and restrictor 40 to derive pressure fluid therefrom.

For the purpose of driving the wheel 62 of dispenser 60 at a speed which is proportional to the speed of rotation of drum 16, there may be provided the gearing 88 and the shaft means 90 that effect a direct connection of the said dispensing wheel with the shaft 22 of the filter drum.

In operation, assuming a work cycle to be in progress in tank 10 and the fluid therein to be in a condition requiring filtering, the filter is placed in operation by energizing motor 68 to bring about rotation of drum 16 in the direction indicated by the arrow in Figure 1 and the pump 36 is also started. Energization of motor 68 will not only bring about rotation of drum 16, but will also cause rotation of dispensing wheel 62 to bring about the discharge of dry filter cake forming material into slurry tank 42. The driving of pump 36 causes fluid to be drawn inwardly into the filter drum and can be discharged through conduit 38 to tank 10. This flow of fluid through restrictor 40 causes a pressure to build up between the pump and restrictor that causes the by-pass of a predetermined amount of fluid through conduit 46 to the slurry tank. This by-pass fluid forms a slurry with the dry filter aid material which is discharged through conduit 52 and manifold 54 toward that portion of the filter drum which has just been scraped. The flow of fluid into the drum due to the action of pump 36 will cause this slurry to form a filter cake on the drum and due to the fact that the flow of fluid into the drum will be most rapid over the scraped portion, substantially all of the slurry will be directed to the portion of the drum and the new cake will build up rapidly.

If, for one reason or another, the fluid being filtered carries enough soil that the rate of flow to the filtered drum drops below a predetermined amount, then the pressure at the discharge side of pump 36 will drop and this drop in pressure will be conveyed through conduit 86 to element 84, permitting the element to collapse and to close contact arm 82 on one of the contacts of switch 80. This will energize motor 72 to run in a direction that will increase the speed of the output shaft of the unit 64 and thereby increase the speed of rotation of the filtered drum. This will increase the rate at which the soil cake is removed from the filter drum and the rate at which a new cake is built up thereon and will, of course, increase the rate at which the filtering fluid will flow into the filter drum.

Whenever the amount of clean cake on the drum reaches the point where the fluid flow into the filter increases to the desired amount, the pressure at the discharge side of pump 36 will increase and element 84 will again be expanded to bring the contact arm 82 into spaced relation with both of the stationary contacts of switch 80, thereby halting adjustment of the speed of rotation of the filter drum.

If, subsequently, the rate of fluid flow into the filter drum exceeds a predetermined amount, then the pressure at the discharge side of pump 36 will rise and be conveyed through conduit 86 to element 84 and expand the said element so that switch arm 82 will contact the other of the fixed contacts of switch 80 and energize motor 72 to run in a direction to so adjust unit 64 that the speed of rotation of the filter drum will be reduced. This will continue until the pressure at the discharge side of pump 36 is reduced to the point that element 84 will contract and disengage the contact arm 82 from the said contact.

It will be evident that the unit 64 could be arranged so that under extreme conditions the rotation of shaft 22 came to a complete halt but, under most circumstances, it will be satisfactory for the speed of shaft 22 merely to be varied between predetermined limits with the lower limit being a relatively low speed.

It will also be evident that the nature of pump 36 should be such that the discharge pressure thereof gives a ready indication of the flow rate therethrough and because of this, it is preferred that the pump 36 be of the induction type such as a centrifugal pump rather than a positive displacement type such as a gear pump or radial pump.

In Figure 4, there is illustrated a modification wherein the slurry tank 42 and the conduit 46 are eliminated and instead the dispenser 60 discharges into a compartment 92 that is arranged with a screen 94 over its bottom and through which the entire discharge of conduit 14 passes. In all other respects the modification of Figure 4 is the same as the one described and the principal difference is that the filtered material is delivered directly to the fluid to be filtered rather than being formed into a slurry with filtered fluid and then delivered to a selected point adjacent the filter drum. In connection with the Figure 4 modification the tendency would be for the filter cake forming material to be deposited on the drum immediately behind the scraper blade because the rate of fluid flow through that part of the drum is the greatest. Thus, a satisfactory filter cake can be built up by using this modification. Where the fluid to be filtered is exceedingly soiled, the Figure 1 arrangement is to be preferred, but in other cases where the soil is not excessive, the Figure 4 arrangement has proved quite satisfactory.

It will be understood that this invention is susceptible to modification in order to adapt it to different usages and conditions and, accordingly, it is desired to comprehend such modifications within this invention as may fall within the scope of the appended claims.

What I claim is:

1. In a filter: a tank, a perforate filter drum rotatably mounted in the tank, a scraper blade bearing on the periphery of the drum, a dispenser driveable for dispensing filter aid to the tank, a continuously operating drive motor, a speed varying unit connecting the drive motor with the drum and the dispenser for the simultaneous and continuous operation thereof, a reversible motor for adjusting said unit, a pump having its inlet connected with the interior of said drum, a restrictor connected to the outlet of said pump, means responsive to the pressure on the outlet side of said pump for controlling the energization of said reversible motor, said means comprising a double throw switch and a pressure responsive element connected for actuating the switch and in fluid communication with the outlet of said pump.

2. A continuously operating filter comprising a work tank containing fluid to be filtered, a filtering tank, fluid connecting means between said tanks, a rotatable filter drum in said filtering tank having a perforate periphery, a fixed scraper blade bearing on said periphery, a slurry tank positioned above the normal liquid level in said tank and having discharge means immediately above that part of the drum which has been scraped by said blade, a drivable dispenser for dispensing filter cake forming material into said slurry tank, a continuously operating drive motor, a variable speed unit interconnecting said drive motor with said drum and dispenser for simultaneous and continuous operation thereof, a reversible motor connected to said variable-speed means, a fluid connecting means between the interior of said drum and said work tank, a suction pump in said connecting means for forcing filtered fluid from said drum to said work tank thereby providing a continuously flowing fluid circuit between said tanks, a restrictor connected between the discharge side of said pump and the said work tank, fluid connecting means between the inlet side of said restrictor and said slurry tank, and conduit means connected to the inlet side of said restrictor, a pressure-responsive bellows attached to said conduit means, said bellows being responsive to pressure variations in the fluid at the discharge side of the pump, and means connecting said bellows to said reversible motor whereby said motor is energized in response to said pressure variations.

3. In a filter: a tank, a perforate filter drum rotatably mounted in the tank, a scraper blade bearing on the periphery of said drum at the top, a slurry tank positioned above the normal liquid level in said tank, a manifold opening from the slurry tank to a point behind said scraper blade, a dispenser for dispensing filter cake forming material to said slurry tank, a pump having its inlet connected to the interior of said drum, a restrictor connected to the outlet of said pump, a conduit extending from the oulet side of said pump to said slurry tank to supply liquid thereto, continuously - operating variable - speed means for driving said drum and dispenser simultaneously and continuously, pressure-responsive means connected to said conduit and actuated by pressure variations at the outlet side of said pump, and means connecting said pressure-responsive means and said variable-speed means for energizing said variable-speed means in response to said pressure variations.

References Cited in the file of this patent

UNITED STATES PATENTS

| Number | Name | Date |
|---|---|---|
| 1,579,171 | Zoul | Mar. 30, 1926 |
| 2,055,869 | Manning | Sept. 29, 1936 |
| 2,270,938 | Doescher | Jan. 27, 1942 |
| 2,321,455 | Byrne | June 8, 1943 |
| 2,576,275 | Bench | Nov. 27, 1951 |
| 2,576,288 | Fink et al. | Nov. 27, 1951 |